United States Patent
Hsiao et al.

(10) Patent No.: US 9,030,613 B2
(45) Date of Patent: May 12, 2015

(54) LIQUID CRYSTAL DISPLAY PANEL AND LIQUID CRYSTAL DISPLAY APPARATUS AND 3D IMAGE SYSTEM

(75) Inventors: Chia-Chiang Hsiao, Shenzhen (CN); Chih-Wen Chen, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 64 days.

(21) Appl. No.: 13/574,579

(22) PCT Filed: May 9, 2012

(86) PCT No.: PCT/CN2012/075226
§ 371 (c)(1),
(2), (4) Date: Jul. 20, 2012

(87) PCT Pub. No.: WO2013/163824
PCT Pub. Date: Nov. 7, 2013

(65) Prior Publication Data
US 2013/0293794 A1    Nov. 7, 2013

(30) Foreign Application Priority Data
May 4, 2012   (CN) .......................... 2012 1 0137215

(51) Int. Cl.
*G02F 1/1335* (2006.01)
*G02B 27/26* (2006.01)

(52) U.S. Cl.
CPC .......... *G02B 27/26* (2013.01); *G02F 1/133512* (2013.01)

(58) Field of Classification Search
CPC ....................................................... G02B 27/26
USPC ............................................................ 349/15
See application file for complete search history.

(56) References Cited

U.S. PATENT DOCUMENTS

| | | | |
|---|---|---|---|
| 6,046,787 A * | 4/2000 | Nishiguchi | 349/129 |
| 6,128,059 A * | 10/2000 | Nishiguchi | 349/129 |
| 2008/0239483 A1* | 10/2008 | Kuroda et al. | 359/465 |
| 2010/0289884 A1* | 11/2010 | Kang | 348/58 |
| 2011/0032345 A1* | 2/2011 | Robinson et al. | 348/58 |
| 2011/0102690 A1* | 5/2011 | Kikuchi et al. | 349/15 |

FOREIGN PATENT DOCUMENTS

JP          2002185983 A  *  6/2002  ............. H04N 13/04

* cited by examiner

*Primary Examiner* — Michael Caley
*Assistant Examiner* — Edmond Lau
(74) *Attorney, Agent, or Firm* — Muncy, Geissler, Olds & Lowe, P.C.

(57) ABSTRACT

The present invention provides a liquid crystal display panel, a liquid crystal display apparatus and a 3D image system. The liquid crystal display panel comprises a patterned retarder and a shading film. The shading film includes a plurality of transparent units and a plurality of shading units arranged in an alternating manner, and the shading units are positioned between the first phase retarders and the second phase retarders, respectively. When the offset of the first phase retarders or the second phase retarders occurs, the shading unit can shade the deviated light rays.

11 Claims, 5 Drawing Sheets

Fig.1

Prior Art

LIQUID CRYSTAL DISPLAY PANEL AND LIQUID CRYSTAL DISPLAY APPARATUS AND 3D IMAGE SYSTEM

FIELD OF THE INVENTION

The present invention relates to a field of a liquid crystal display technology, and more particularly to a liquid crystal display (LCD) panel, a liquid crystal display apparatus and a three-dimensional (3D) image system.

BACKGROUND OF THE INVENTION

Figure 1:
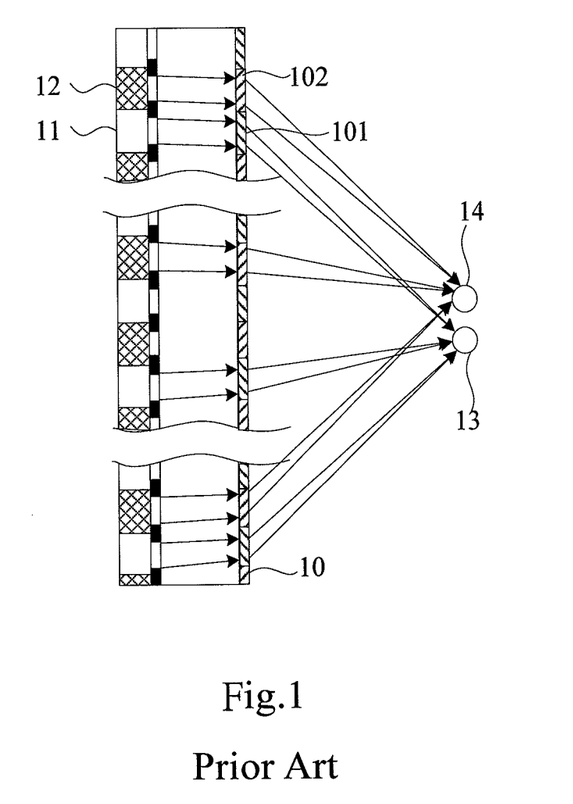
FIG. 1 is a side view showing a conventional 3D image system.

Referring to FIG. 1, pixel regions of a 3D LCD include left eye pixels 11 and right eye pixels 12. A phase retarder 10 is bonded to an outer side of the 3D LCD, and the phase retarder 10 includes left eye phase retarders 101 and right eye phase retarders 102 corresponding to the left eye pixels 11 and the right eye pixels 12, respectively. When boding the phase retarder 10, a machine for bonding may have an allowable tolerance of about ±20 um. When the allowable tolerance occurs, for example, the right eye phase retarders 102 are shifted 20 um with respect to the right eye pixels 12, and thus some light rays which passed through the right eye pixels 12 will be emitted to the left eye phase retarders 101. As a result, a user's left eye 13 will view the images which correspond to the right eye 14, resulting in an image crosstalk.

As a result, it is necessary to provide an LCD panel, an LCD apparatus and a 3D image system to solve the problems existing in the conventional technologies, as described above.

SUMMARY OF THE INVENTION

An object of the present invention is to provide an LCD panel, so as to solve the image crosstalk problem resulting from the offset of the phase retarders.

For solving the above-mentioned problem, the present invention provides a liquid crystal display panel, and the liquid crystal display panel comprises: a first substrate including a black matrix and a plurality of color filters, wherein the color filters are arranged in the black matrix at intervals; a second substrate including a plurality of pixel regions corresponding to the color filters, wherein each of the pixel regions includes a left eye pixel region and a right eye pixel region; a liquid crystal layer disposed between the first substrate and the second substrate; a patterned retarder bonded to an outer side of the first substrate and including a plurality of first phase retarders corresponding to the left eye pixel regions and a plurality of second phase retarders corresponding to the right eye pixel regions, wherein the black matrix is positioned between the first phase retarders and the second phase retarders; a shading film disposed at the outer side of the first substrate and corresponding to the black matrix, wherein the shading film includes a plurality of transparent units and a plurality of shading units arranged in an alternating manner, and the shading units are positioned between the first phase retarders and the second phase retarders, respectively; wherein light rays are emitted along a light emitting direction and vertical to the second substrate, and a vertical direction is vertical to the light emitting direction and parallel to a longitudinal direction of the black matrix, and the first substrate has a midline parallel to the light emitting direction and passing through a center of the first substrate, and each of the shading units has a shading length along the vertical direction, and along the vertical direction, the shading length increases in accordance with an increase of a distance between each of the shading units and the midline; wherein, along the vertical direction, a length of the first phase retarders and the second phase retarders is less than a length of the left eye pixel regions and the right eye pixel regions corresponding thereto.

In one embodiment of the present invention, the shading film is disposed between the first substrate and the patterned retarder.

In one embodiment of the present invention, the shading film is disposed at an outer side of the patterned retarder.

In one embodiment of the present invention, each of black units of the black matrix has one first end close to the midline and another first end far away the midline, and each of the shading units has one second end close to the midline and another second end far away the midline, and along the light emitting direction, the first end of the black matrix and the second end of the corresponding shading unit are positioned on the same level.

In one embodiment of the present invention, along the vertical direction, there is an image distance between the another second end of the shading unit and the another first end of the black matrix.

Another object of the present invention is to provide an LCD panel, so as to solve the image crosstalk problem resulting from the offset of the phase retarders.

For solving the above-mentioned problem, the present invention provides a liquid crystal display panel, and the liquid crystal display panel comprises: a first substrate including a black matrix and a plurality of color filters, wherein the color filters are arranged in the black matrix at intervals; a second substrate including a plurality of pixel regions corresponding to the color filters, wherein each of the pixel regions includes a left eye pixel region and a right eye pixel region; a liquid crystal layer disposed between the first substrate and the second substrate; a patterned retarder bonded to an outer side of the first substrate and including a plurality of first phase retarders corresponding to the left eye pixel regions and a plurality of second phase retarders corresponding to the right eye pixel regions, wherein the black matrix is positioned between the first phase retarders and the second phase retarders; and a shading film disposed at the outer side of the first substrate and corresponding to the black matrix, wherein the shading film includes a plurality of transparent units and a plurality of shading units arranged in an alternating manner, and the shading units are positioned between the first phase retarders and the second phase retarders, respectively.

In one embodiment of the present invention, the shading film is disposed between the first substrate and the patterned retarder.

In one embodiment of the present invention, the shading film is disposed at an outer side of the patterned retarder.

In one embodiment of the present invention, light rays are emitted along a light emitting direction and vertical to the second substrate, and the first substrate has a midline parallel to the light emitting direction and passing through a center of the first substrate, and each of black units of the black matrix has one first end close to the midline and another first end far away the midline, and each of the shading units has one second end close to the midline and another second end far away the midline, and along the light emitting direction, the first end of the black matrix and the second end of the corresponding shading unit are positioned on the same level.

In one embodiment of the present invention, a vertical direction is vertical to the light emitting direction and parallel to a longitudinal direction of the black matrix, and along the vertical direction, there is an image distance between the another second end of the shading unit and the another first end of the black matrix.

In one embodiment of the present invention, each of the shading units has a shading length along the vertical direction, and along the vertical direction, the shading length increases in accordance with an increase of a distance between each of the shading units and the midline.

In one embodiment of the present invention, along the vertical direction, a length of the first phase retarders and the second phase retarders is less than a length of the left eye pixel regions and the right eye pixel regions corresponding thereto.

Still another object of the present invention is to provide an LCD apparatus, so as to solve the image crosstalk problem resulting from the offset of the phase retarders.

For solving the above-mentioned problem, the present invention provides a liquid crystal display apparatus comprising a backlight module and a liquid crystal display panel, wherein the liquid crystal display panel comprises: a first substrate including a black matrix and a plurality of color filters, wherein the color filters are arranged in the black matrix at intervals; a second substrate including a plurality of pixel regions corresponding to the color filters, wherein each of the pixel regions includes a left eye pixel region and a right eye pixel region; a liquid crystal layer disposed between the first substrate and the second substrate; a patterned retarder bonded to an outer side of the first substrate and including a plurality of first phase retarders corresponding to the left eye pixel regions and a plurality of second phase retarders corresponding to the right eye pixel regions, wherein the black matrix is positioned between the first phase retarders and the second phase retarders; and a shading film disposed at the outer side of the first substrate and corresponding to the black matrix, wherein the shading film includes a plurality of transparent units and a plurality of shading units arranged in an alternating manner, and the shading units are positioned between the first phase retarders and the second phase retarders, respectively.

In one embodiment of the present invention, the shading film is disposed between the first substrate and the patterned retarder.

In one embodiment of the present invention, the shading film is disposed at an outer side of the patterned retarder.

In one embodiment of the present invention, light rays are emitted along a light emitting direction and vertical to the second substrate, and the first substrate has a midline parallel to the light emitting direction and passing through a center of the first substrate, and each of black units of the black matrix has one first end close to the midline and another first end far away the midline, and each of the shading units has one second end close to the midline and another second end far away the midline, and along the light emitting direction, the first end of the black matrix and the second end of the corresponding shading unit are positioned on the same level.

In one embodiment of the present invention, a vertical direction is vertical to the light emitting direction and parallel to a longitudinal direction of the black matrix, and along the vertical direction, there is an image distance between the another second end of the shading unit and the another first end of the black matrix.

In one embodiment of the present invention, each of the shading units has a shading length along the vertical direction, and along the vertical direction, the shading length increases in accordance with an increase of a distance between each of the shading units and the midline.

In one embodiment of the present invention, along the vertical direction, a length of the first phase retarders and the second phase retarders is less than a length of the left eye pixel regions and the right eye pixel regions corresponding thereto.

Still another object of the present invention is to provide 3D image system, so as to solve the image crosstalk problem resulting from the offset of the phase retarders.

For solving the above-mentioned problem, the present invention provides a 3D image system comprising 3D glasses and a liquid crystal display apparatus, wherein the liquid crystal display apparatus comprises a backlight module and a liquid crystal display panel, and the liquid crystal display panel comprises: a first substrate including a black matrix and a plurality of color filters, wherein the color filters are arranged in the black matrix at intervals; a second substrate including a plurality of pixel regions corresponding to the color filters, wherein each of the pixel regions includes a left eye pixel region and a right eye pixel region; a liquid crystal layer disposed between the first substrate and the second substrate; a patterned retarder bonded to an outer side of the first substrate and including a plurality of first phase retarders corresponding to the left eye pixel regions and a plurality of second phase retarders corresponding to the right eye pixel regions, wherein the black matrix is positioned between the first phase retarders and the second phase retarders; and a shading film disposed at the outer side of the first substrate and corresponding to the black matrix, wherein the shading film includes a plurality of transparent units and a plurality of shading units arranged in an alternating manner, and the shading units are positioned between the first phase retarders and the second phase retarders, respectively.

By using the shading film disposed at the outer side of the first substrate, when the offset of the first phase retarders or the second phase retarders occurs, the shading unit of the shading film can shade the deviated light rays, thereby preventing the image crosstalk problem.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto. In the drawings, structure-like elements are labeled with like reference numerals.

Figure 2:
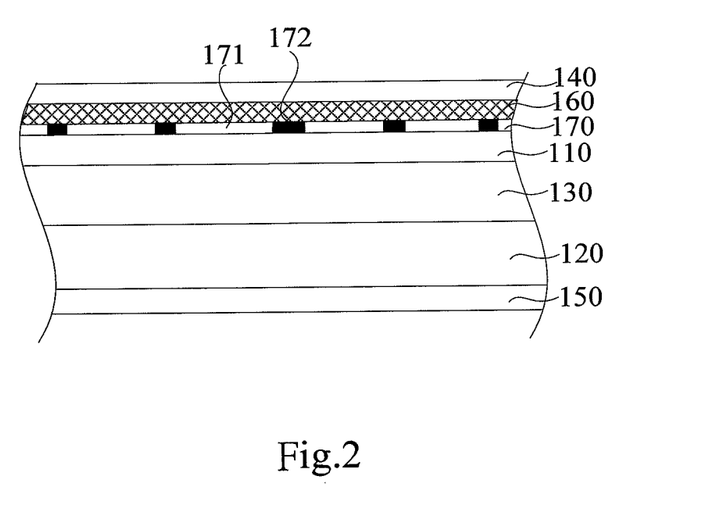
FIG. 2 is a cross-sectional view showing a liquid crystal display panel according to a first preferred embodiment of the present invention.

FIG. 2 is a cross-sectional view showing a liquid crystal display (LCD) panel according to a first preferred embodiment of the present invention.

Referring to FIG. 2 again, a cross-sectional view showing the LCD panel according to the first preferred embodiment of the present invention is illustrated. The LCD apparatus of the present embodiment can comprises the liquid crystal display panel 100 and a backlight module (not shown). The liquid crystal display panel 100 is disposed opposite to the backlight module, and the backlight module may be realized as a side lighting backlight module or a bottom lighting backlight module to provide the liquid crystal display panel 100 with the back-light.

Referring to FIG. 2 again, the liquid crystal display panel 100 may comprise a first substrate 110, a second substrate 120, a liquid crystal layer 130, a first polarizer 140 and a second polarizer 150, a patterned retarder 160 and a shading film 170. The liquid crystal layer 130 is formed between the first substrate 110 and the second substrate 120. That is, the liquid crystal layer 130 is positioned at inner sides of the first substrate 110 and the second substrate 120. The first polarizer 140 is disposed at an outer side of the first substrate 110, and the second polarizer 150 is disposed at an outer side of the second substrate 120. In the present invention, the patterned retarder 160 is bonded to the outer side of the first substrate 110, and the shading film 170 can be disposed between the patterned retarder 160 and the first substrate 110.

Referring to FIG. 2, the first substrate 110 and the second substrate 120 may be realized as glass substrates or flexible plastic substrates. The first substrate 110 may be a glass substrate or other material substrate with color filters (CF), and the second substrate 120 may be a glass substrate or other material substrate with a thin film transistor (TFT) array. It notes that the CF and the TFT array may also be disposed on the same substrate in other embodiments.

Figure 3:
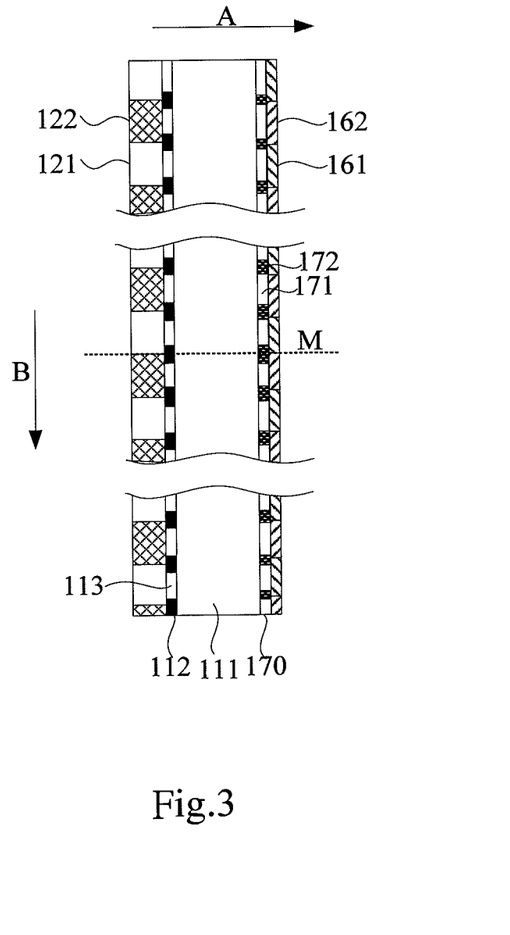
FIG. 3 is a partially side view shown in FIG. 2.

Referring to FIG. 3, FIG. 3 is a partially side view of the liquid crystal display panel shown in FIG. 2.

The second substrate 120 includes a plurality of signal lines (not shown), such as gate lines and data lines, which are arranged in a crisscross pattern, thereby forming a plurality of pixel regions. Each of the pixel regions includes a left eye pixel region 121 and right eye pixel region 122 shown in FIG. 3 for displaying different images corresponding to user's left and right eyes in a 3D display state.

The first substrate 110 includes a glass substrate 111, a black matrix (BM) 112 and a plurality of color filters 113, and the black matrix 112 and the color filters 113 are positioned on the same layer. The color filters 113 may be red filters (R), green filters (G) or blue filters (B). The color filters 113 are arranged in the black matrix 112 at intervals, and the color filters R, G, B correspond to the pixel regions of the second substrate 120.

The patterned retarder 160 is bonded to the outer side of the first substrate 110. More specifically, the patterned retarder 160 is bonded to an outer surface of the glass substrate 111 and includes a plurality of first phase retarders 161 and a plurality of second phase retarders 162. The first phase retarders 161 correspond to the left eye pixel regions 121, and the second phase retarders 162 correspond to the right eye pixel regions 122. The black matrix 112 is positioned between the first phase retarders 161 and the second phase retarders 162.

Referring to FIG. 2 and FIG. 3 again, the shading film 170 is disposed at the outer side of the first substrate 110. More specifically, the shading film 170 is disposed between the first substrate 110 and the patterned retarder 160 and corresponding to the black matrix 112. In this case, the shading film 170 includes a plurality of transparent units 171 and a plurality of shading units 172 arranged in an alternating manner. The shading units 172 are positioned between the first phase retarders 161 and the second phase retarders 162, respectively. The material of the shading units 172 is preferably similar to the material of the black matrix 112.

Referring to FIG. 3, light rays are emitted along a light emitting direction A and vertical to the first substrate 110. The first substrate 110 has a midline M parallel to the light emitting direction A and passing through a center of the first substrate 110.

Figure 4:
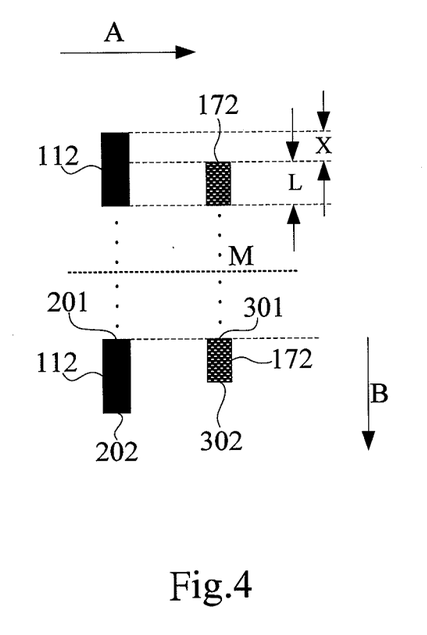
FIG. 4 illustrates a position relation between the black matrix and the shading units shown in FIG. 3.

Referring to FIG. 4, FIG. 4 illustrates a position relation between the black matrix 112 and the corresponding shading units 172. Each of black units of the black matrix has one first end 201 close to the midline M and another first end 202 far away the midline M. Each of the shading units 172 has one second end 301 close to the midline M and another second end 302 far away the midline M. Along the light emitting direction A, the first end 201 of the black matrix 112 and the second end 301 of the corresponding shading unit 172 are positioned on the same level.

Referring to FIG. 3 and FIG. 4 again, a vertical direction B is vertical to the light emitting direction A and parallel to a longitudinal direction of the black matrix 112. Along the vertical direction B, there is an image distance X between the second end 302 of the shading unit 172 and the corresponding first end 202 of the black matrix 112, so as to allow the light rays to pass through.

Referring to FIG. 3 again, along the vertical direction B, the first phase retarders 161 and the second phase retarders 162 are shorter then the corresponding left eye pixel regions 121 and the corresponding right eye pixel regions 122. A width of the first phase retarders 161 and the second phase retarders 162 is less then a width of the corresponding left eye pixel regions 121 and the corresponding right eye pixel regions 122. For example, along the vertical direction B, the first phase retarder 161 may be shorter then the corresponding left eye pixel region 121 by 0.5 um.

Figure 5:
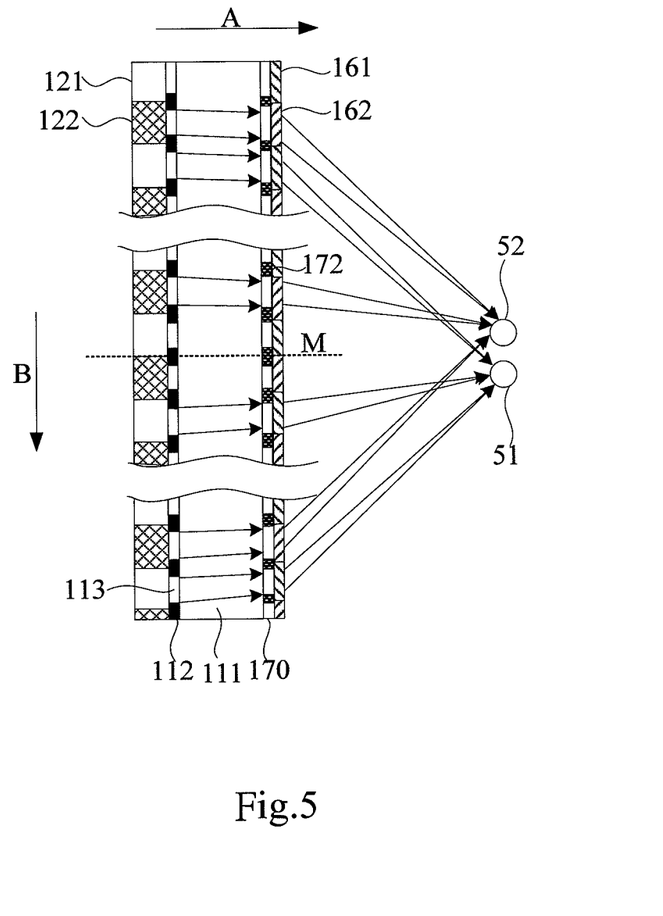
FIG. 5 is a schematic diagram showing an effect in FIG. 4.

Referring to FIG. 5, a schematic diagram showing a process of using the liquid crystal display panel according to the first preferred embodiment shown in FIG. 2 to FIG. 4 is illustrated.

The light rays from the left eye pixel regions 121 can pass through the first phase retarders 161 and are emitted to a left eye 51. The light rays from the right eye pixel regions 122 can pass through the second phase retarders 162 and are emitted to a right eye 52. An offset may occur between the first phase retarders 161 and the second phase retarders 162. For example, the second phase retarders 162 may be shifted to the first phase retarders 161, and some light rays passed through the second phase retarders 162 may be emitted to the left eye 51. At this time, the shading unit 172 can shade the deviated light rays, thereby preventing user's left eye 51 from viewing right eye images, i.e. preventing the image crosstalk problem.

Figure 6:
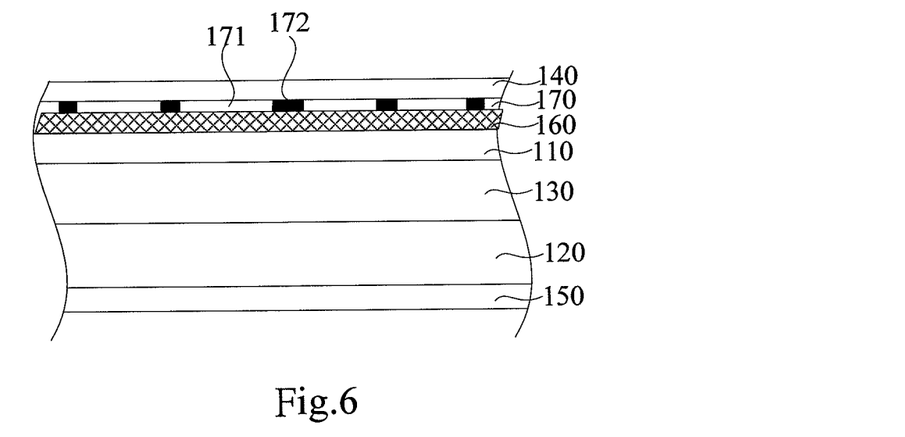
FIG. 6 is a cross-sectional view showing a liquid crystal display panel according to a second preferred embodiment of the present invention.
Figure 7:
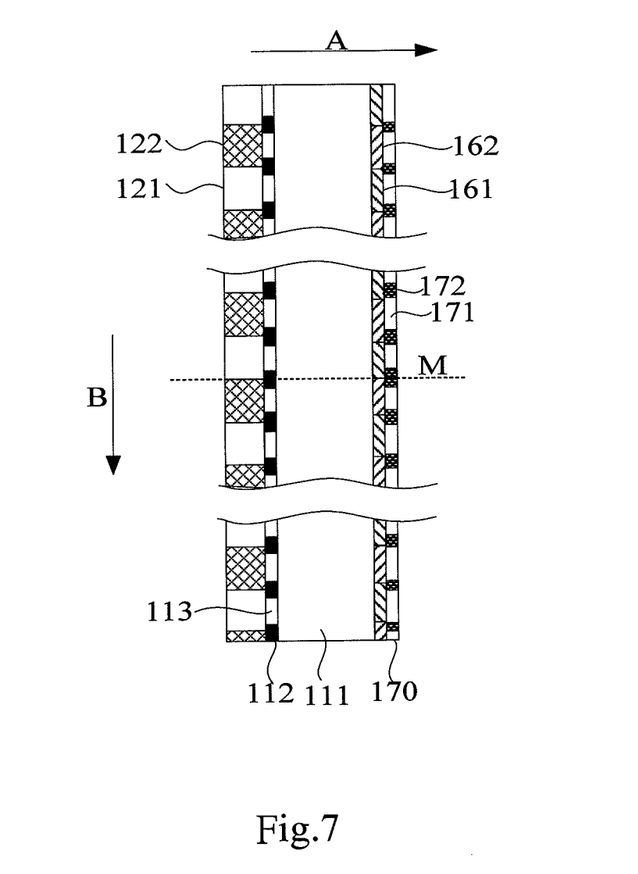
FIG. 7 is a partially side view shown in FIG. 6.

FIG. 6 is a cross-sectional view showing a liquid crystal display panel according to a second preferred embodiment of the present invention. FIG. 7 is a partially side view of the liquid crystal display panel shown in FIG. 6.

The difference between this embodiment and the first embodiment shown in FIG. 2 is that the shading film 170 shown in FIG. 6 is disposed at an outer side of the patterned retarder 160. More specifically, the shading film 170 is disposed between the patterned retarder 160 and the first polarizer 140. The shading film 170 includes the transparent units 171 and the shading units 172, and the material of the shading units 172 is preferably similar to the material of the black matrix 112.

The process of using the liquid crystal display panel according to the second preferred embodiment shown in FIG. 6 and FIG. 7 is similar to the first preferred embodiment shown in FIG. 2 to FIG. 4, and is not mentioned for simplification.

The present invention further provides an LCD apparatus. The LCD apparatus comprises the LCD panel provided by the present invention. The present invention further provides a 3D image system comprising 3D glasses and the above-mentioned LCD panel, and is not mentioned for simplification.

By using the shading film disposed at the outer side of the first substrate, when the offset of the first phase retarders or the second phase retarders occurs, the shading unit can shade the deviated light rays, thereby preventing the image crosstalk problem.

The present invention has been described with a preferred embodiment thereof and it is understood that many changes and modifications to the described embodiment can be carried out without departing from the scope and the spirit of the invention that is intended to be limited only by the appended claims.

The inventiom claimed is:

1. A liquid crystal display panel, comprising:
   a first substrate including a black matrix and a plurality of color filters, wherein the color filters are arranged in the black matrix at intervals;
   a second substrate including a plurality of pixel regions corresponding to the color filters, wherein each of the pixel regions includes a left eye pixel region and a right eye pixel region;
   a liquid crystal layer disposed between the first substrate and the second substrate;
   a patterned retarder bonded to an outer side of the first substrate and including a plurality of first phase retarders corresponding to the left eye pixel regions and a plurality of second phase retarders corresponding to the right eye pixel regions, wherein the black matrix is positioned between the first phase retarders and the second phase retarders; and
   a shading film disposed at the outer side of the first substrate and corresponding to the black matrix, wherein the shading film includes a plurality of transparent units and a plurality of shading units arranged in an alternating manner, and the shading units are positioned between the first phase retarders and the second phase retarders, respectively;
   wherein a length of the first phase retarders and the second phase retarders is less than a length of the left eye pixel regions and the right eye pixel regions corresponding thereto.

2. The liquid crystal display panel according to claim 1, wherein the shading film is disposed between the first substrate and the patterned retarder.

3. The liquid crystal display panel according to claim 1, wherein the shading film is disposed at an outer side of the patterned retarder.

4. The liquid crystal display panel according to claim 1, wherein light rays are emitted along a light emitting direction and vertical to the second substrate, and the first substrate has a midline parallel to the light emitting direction and passing through a center of the first substrate, and each of black units of the black matrix has one first end close to the midline and another first end far away the midline, and each of the shading units has one second end close to the midline and another second end far away the midline, and along the light emitting direction, the first end of the black matrix and the second end of the corresponding shading unit are positioned on the same level.

5. The liquid crystal display panel according to claim 4, wherein a vertical direction is vertical to the light emitting direction and parallel to a longitudinal direction of the black matrix, and along the vertical direction, there is an image distance between the another second end of the shading unit and the another first end of the black matrix.

6. A liquid crystal display apparatus comprising a backlight module and a liquid crystal display panel, wherein the liquid crystal display panel comprises:
   a first substrate including a black matrix and a plurality of color filters, wherein the color filters are arranged in the black matrix at intervals;
   a second substrate including a plurality of pixel regions corresponding to the color filters, wherein each of the pixel regions includes a left eye pixel region and a right eye pixel region;
   a liquid crystal layer disposed between the first substrate and the second substrate;
   a patterned retarder bonded to an outer side of the first substrate and including a plurality of first phase retarders corresponding to the left eye pixel regions and a plurality of second phase retarders corresponding to the right eye pixel regions, wherein the black matrix is positioned between the first phase retarders and the second phase retarders; and
   a shading film disposed at the outer side of the first substrate and corresponding to the black matrix, wherein the shading film includes a plurality of transparent units and a plurality of shading units arranged in an alternating manner, and the shading units are positioned between the first phase retarders and the second phase retarders, respectively;
   wherein a length of the first phase retarders and the second phase retarders is less than a length of the left eye pixel regions and the right eye pixel regions corresponding thereto.

7. The liquid crystal display apparatus according to claim 6, wherein the shading film is disposed between the first substrate and the patterned retarder.

8. The liquid crystal display apparatus according to claim 6, wherein the shading film is disposed at an outer side of the patterned retarder.

9. The liquid crystal display apparatus according to claim 6, wherein light rays are emitted along a light emitting direction and vertical to the second substrate, and the first substrate has a midline parallel to the light emitting direction and passing through a center of the first substrate, and each of black units of the black matrix has one first end close to the midline and another first end far away the midline, and each of the shading units has one second end close to the midline and another second end far away the midline, and along the light emitting direction, the first end of the black matrix and the second end of the corresponding shading unit are positioned on the same level.

10. The liquid crystal display apparatus according to claim 6, wherein a vertical direction is vertical to the light emitting direction and parallel to a longitudinal direction of the black matrix, and along the vertical direction, there is an image distance between the another second end of the shading unit and the another first end of the black matrix.

11. A 3D image system comprising 3D glasses and a liquid crystal display apparatus, wherein the liquid crystal display apparatus comprises a backlight module and a liquid crystal display panel, and the liquid crystal display panel comprises:

a first substrate including a black matrix and a plurality of color filters, wherein the color filters are arranged in the black matrix at intervals;

a second substrate including a plurality of pixel regions corresponding to the color filters, wherein each of the pixel regions includes a left eye pixel region and a right eye pixel region;

a liquid crystal layer disposed between the first substrate and the second substrate;

a patterned retarder bonded to an outer side of the first substrate and including a plurality of first phase retarders corresponding to the left eye pixel regions and a plurality of second phase retarders corresponding to the right eye pixel regions, wherein the black matrix is positioned between the first phase retarders and the second phase retarders; and a shading film disposed at the outer side of the first substrate and corresponding to the black matrix, wherein the shading film includes a plurality of transparent units and a plurality of shading units arranged in an alternating manner, and the shading units are positioned between the first phase retarders and the second phase retarders, respectively;

wherein a length of the first phase retarders and the second phase retarders is less than a length of the left eye pixel regions and the right eye pixel regions corresponding thereto.

* * * * *